United States Patent
Chen (10) Patent No.: US 10,785,112 B2
(45) Date of Patent: Sep. 22, 2020

(54) INTERNAL USER-GUIDE SERVER FOR A CUSTOMER PREMISE EQUIPMENT DEVICE

(71) Applicant: ARRIS Enterprises LLC, Suwanee, GA (US)

(72) Inventor: Jianxiang Chen, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 198 days.

(21) Appl. No.: 15/541,329

(22) PCT Filed: Aug. 18, 2015

(86) PCT No.: PCT/CN2015/087416
§ 371 (c)(1),
(2) Date: Jun. 30, 2017

(87) PCT Pub. No.: WO2017/028208
PCT Pub. Date: Feb. 23, 2017

(65) Prior Publication Data
US 2020/0014596 A1    Jan. 9, 2020

(51) Int. Cl.
*H04L 29/08* (2006.01)
*H04L 12/24* (2006.01)
*H04L 29/06* (2006.01)

(52) U.S. Cl.
CPC ...... *H04L 41/0873* (2013.01); *H04L 41/0654* (2013.01); *H04L 41/5064* (2013.01); *H04L 41/5074* (2013.01); *H04L 65/4069* (2013.01); *H04L 65/601* (2013.01); *H04L 65/80* (2013.01); *H04L 69/323* (2013.01)

(58) Field of Classification Search
CPC ... H04L 41/0873; H04L 69/323; H04L 65/80; H04L 65/601; H04L 65/4069; H04L 41/5074; H04L 41/5064; H04L 41/0654; H04L 41/00; H04L 41/0866
See application file for complete search history.

(56) References Cited

U.S. PATENT DOCUMENTS

| 2013/0007240 | A1* | 1/2013 | Qiu | H04L 65/4084 709/223 |
| 2013/0185715 | A1* | 7/2013 | Dunning | G06F 9/45558 718/1 |
| 2014/0105000 | A1* | 4/2014 | Muccione | H04L 69/40 370/216 |

* cited by examiner

*Primary Examiner* — Kim T Nguyen
(74) *Attorney, Agent, or Firm* — Wenderoth, Lind & Ponack, L.L.P.

(57) ABSTRACT

Methods, systems, and computer readable media can be operable to output troubleshooting and/or setup information associated with a device from a server within the device. In embodiments, troubleshooting and/or setup information is output from within the device to a subscriber when the device detects that an issue or failure exists with the device's connection to a network. A data or service request received from a subscriber can be rerouted to a server within the receiving device, and troubleshooting and/or setup information can be output as a result.

17 Claims, 4 Drawing Sheets

INTERNAL USER-GUIDE SERVER FOR A CUSTOMER PREMISE EQUIPMENT DEVICE

TECHNICAL FIELD

This disclosure relates to the delivery of information from an internal server of a device.

BACKGROUND

Internet users typically rely on a working connection to the Internet as a primary source for obtaining problem solving tips and solutions for issues with networking and multimedia devices. However, when an issue with a user's Internet connection occurs, the user may be unable to access troubleshooting information from the Internet. For example, when a customer premise equipment (CPE) device loses connection to the Internet, the user may be precluded from searching the Internet for information on how to solve the issue with the CPE device.

Typically, a user of a CPE device is provided with a user manual in either paper or compact disc format. The user can consult the user manual to find helpful information for setting up the associated CPE device or troubleshooting issues with the CPE device. However, paper user manuals are easily misplaced and/or lost by users, and user manuals may not be installed on a device before an issue arises with the device. Therefore, a need exists for an improved source through which to provide a user with information for setting up and/or troubleshooting issues with a CPE device.

BRIEF DESCRIPTION OF THE DRAWINGS

Like reference numbers and designations in the various drawings indicate like elements.

DETAILED DESCRIPTION

It is desirable to provide a subscriber with dependable and convenient access to troubleshooting and/or setup information associated with a customer premise equipment (CPE) device. In embodiments, user-guide files (e.g., files containing information for troubleshooting and/or setting up a CPE device) are stored on the CPE device. For example, user-guide files can be stored on a server within the CPE device. In embodiments, one or more user-guide files stored within the CPE device are associated with a specific networking layer (e.g., physical layer, link layer, transport layer, etc.) and/or specific device or network components (e.g., hardware components, network credentials, configuration information, etc.). In embodiments, multiple user-guide files stored within the CPE device are ordered hierarchically according to a level of dependency existing between components associated with the files. For example, a first user-guide file that is associated with a first component that is dependent on a second component can be positioned below a second user-guide file that is associated with the second component within a hierarchy.

In embodiments, when an issue with the CPE device's network connection is detected, a user-guide file is output from the device's internal server to a subscriber. For example, a user-guide file that is associated with a particular networking layer or component that may be contributing to a detected connection issue can be output from the internal server to the subscriber. In embodiments, the CPE device outputs a user-guide file from the internal server to a subscriber when a resource identifier (e.g., uniform resource locator (URL), Internet Protocol (IP) address, etc.) is received by the CPE device and an issue with the device's network connection exists. For example, the CPE device can translate or reroute the received resource identifier such that a corresponding communication is delivered to the internal server, and a user-guide file can be output from the internal server to the subscriber.

Figure 1:
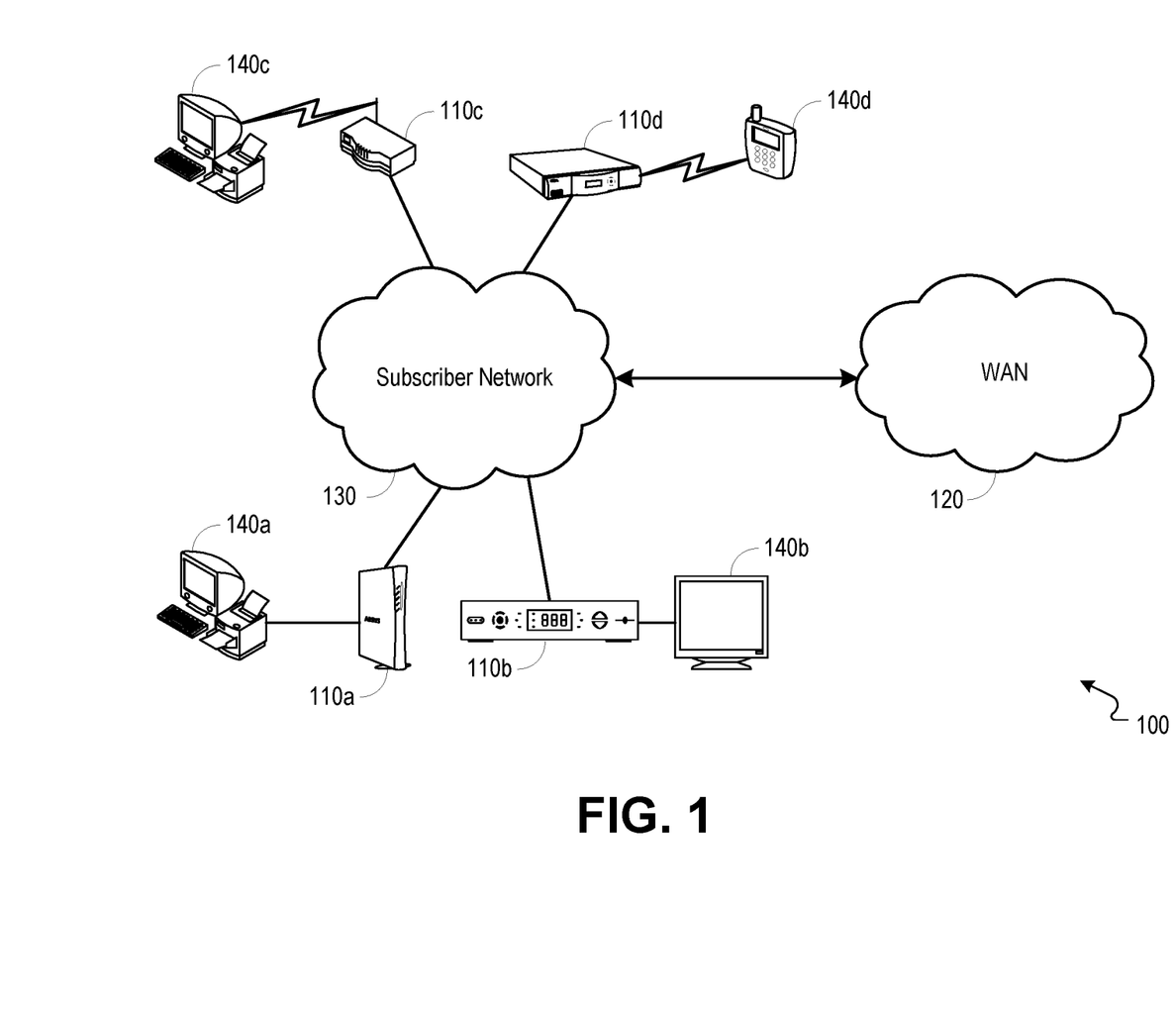
FIG. 1 is a block diagram illustrating an example network environment operable to deliver a user-guide file associated with a CPE device from the CPE device to a subscriber.

FIG. 1 is a block diagram illustrating an example network environment 100 operable to deliver a user-guide file associated with a CPE device from the device to a subscriber. In embodiments, CPE devices 110a-d receive video service(s) and/or data service(s) from a wide area network (WAN) 120 via a connection to a subscriber network 130. The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-d. A cable modem or embedded MTA (eMTA) 110a can facilitate communications between the WAN 120 and a computer 140a. A set-top box 110b can facilitate communications between the WAN 120 and a television 140b or a digital video recorder (DVR). A wireless router 110c can facilitate communications between a computer 140c and the WAN 120. A gateway 110d can facilitate communications between a mobile device 140d and the WAN 120.

For many different reasons, a connection between a CPE device 110a-d and a corresponding subscriber network 130 and/or WAN 120 can become degraded or can otherwise fail. When such a degradation or failure occurs, a subscriber may be precluded from accessing troubleshooting information available on a WAN 120. Further, a connection between the CPE device 110a-d and a corresponding network 130 and/or WAN 120 may not be available when the CPE device is being set-up, thereby precluding the subscriber from accessing device set-up information from a WAN 120. In embodiments, user-guide information (e.g., information for aiding in the setup and/or troubleshooting an issue of a device) can be stored on a CPE device 110a-d. For example, user-guide information can be stored on a server within the CPE device 110a-d. When a subscriber unsuccessfully attempts to retrieve data or a service from a WAN 120, the CPE device 110a-d can output a user-guide file to the subscriber. For example, a user can attempt to retrieve data or a service from a WAN 120 through a client device 140a-d that is connected to the CPE device 110a-d, and the user-guide file can be displayed on the client device 140a-d.

Figure 2:
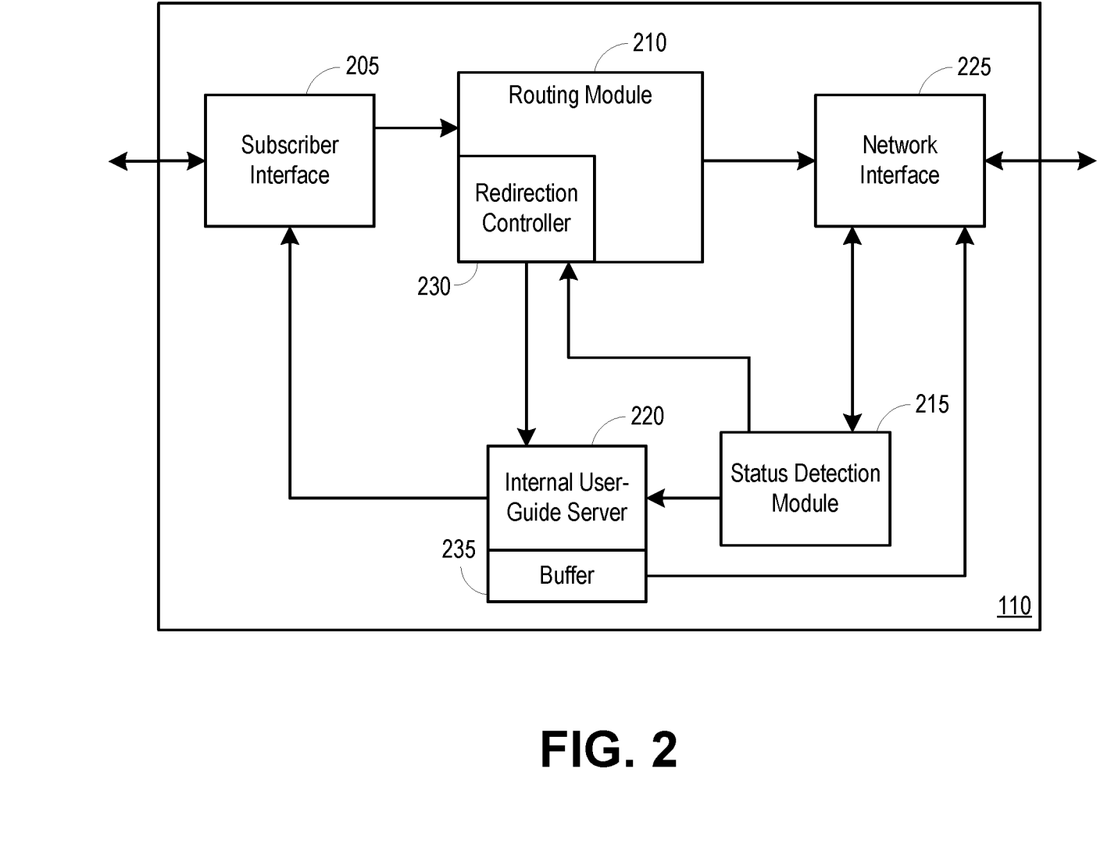
FIG. 2 is a block diagram illustrating an example CPE device operable to output a user-guide file stored within the CPE device to a subscriber.

FIG. 2 is a block diagram illustrating an example CPE device 110 operable to output a user-guide file stored within the CPE device 110 to a subscriber. The CPE device 110 can include a subscriber interface 205, a routing module 210, a status detection module 215, an internal user-guide server 220, and a network interface 225.

In embodiments, the CPE device 110 receives a communication from a subscriber or subscriber device (e.g., subscriber device 140a-d of FIG. 1). For example, the communication can be a request for data or a service from a network (e.g., WAN 120 of FIG. 1). A communication received from a subscriber or subscriber device can be received as a resource identifier (e.g., URL, an IP address, or other format).

In embodiments, a routing module 210 routes a received communication to either a network interface 225 or internal user-guide server 220 depending upon the network connection status of the CPE device 110. In embodiments, the routing module 210 routes the communication to either the network interface 225 or internal user-guide server 220 depending upon whether a redirection controller 230 is turned on. For example, when the CPE device 110 is connected to a network (e.g., subscriber network 130 of FIG. 1, WAN 120 of FIG. 1) without any issues, the redirection controller 230 can be turned off and the routing module 210 can pass the received communication on to the network interface 225. In embodiments, the routing module translates the received communication from a URL to an IP address. When an issue exists with the connection between the CPE device 110 and a network or the CPE device 110 is otherwise not connected to the network, the redirection controller 230 can be turned on and the routing module 210 can reroute, through the redirection controller, the received communication to the internal user-guide server 220. For example, the redirection controller can translate the received communication into an address (e.g., IP address) associated with the internal user-guide server 220. In embodiments, the status detection module 215 enables or disables the redirection controller 230 based upon the network connection status of the CPE device 110 as determined by the status detection module 215.

In embodiments, a status detection module 215 determines the status of the network connection for the CPE device 110. The status detection module 215 can monitor the network connection of the CPE device 110 through the network interface 225. In embodiments, the status detection module 215 monitors one or more various components that are associated with the network connection for the CPE device 110. For example, the status detection module 215 can monitor one or more hardware components (e.g., internal hardware components of the CPE device 110, connection cables such as radio frequency cables, phone lines, digital subscriber lines, etc.) that are used in the connection of the CPE device 110 to a network. This may include physical status detection (e.g., physical mapping to signal). If no signal is detected, a physical component may be broken (e.g., broken line or disconnected plug, etc.). A prompt can instruct a subscriber to check an associated connector or line.

The status detection module 215 can monitor the status of the network and/or data link layer associated with the CPE device 110. For example, the status detection module 215 can monitor the CPE device's connection to a host server (e.g., dynamic host configuration protocol server) and/or the status of configuration information received from the host server. As another example, the status detection module 215 can monitor the CPE device's connection to a packet routing server (e.g., PPP server) and/or subscriber credentials such as a username and password associated with the packet routing server. Data link layer status may include failed (synchronization failure), connected, on-doing (synchronizing), and others. In response to a failure, a re-scan for a cable line and/or retraining for DSL line may be attempted.

In embodiments, the status detection module 215 enables or disables the redirection controller 230 based upon the status of the network connection for the CPE device 110. For example, when the status detection module 215 makes the determination that an issue exists with the CPE device's network connection or that the CPE device is unable to connect to a network (e.g., subscriber network 130 of FIG. 1, WAN 120 of FIG. 1), the status detection module 215 can enable the redirection controller 230. When the status detection module 215 determines that the CPE device 110 is connected to a network, the status detection module 215 can disable the redirection controller 230.

In embodiments, an internal user-guide server 220 stores one or more user-guide files. The one or more user-guide files can be text files (e.g., Hypertext Transfer Protocol (HTTP) files) that include information to aid a subscriber in solving an issue with a network connection or establishing a connection between a network and the CPE device 110. In embodiments, the internal user-guide server 220 outputs a file based upon a status of the network connection for the CPE device 110 as determined by the status detection module 215. For example, when the network connection issue is with a hardware component, troubleshooting advice for solving hardware issues can be output from the internal user-guide server 220 to the subscriber. As another example, when the network connection issue is with a network layer component, troubleshooting advice for solving network layer issues can be output from the internal user-guide server 220 to the subscriber. In embodiments, the output file is associated with a particular hardware or network component for which an issue is detected by the status detection module 215.

In embodiments, the internal user-guide server 220 stores multiple user-guide files that are ordered hierarchically according to a specific order for troubleshooting an issue. For example, user-guide files associated with higher level issues can be placed higher in the hierarchy than user-guide files associated with relatively lower level issues. As another example, a first user-guide file associated with a first component can be placed higher in the hierarchy than a second user-guide file that is associated with a second component that is dependent upon the first component. In embodiments, the internal user-guide server 220 stores multiple user-guide files that are ordered hierarchically according to a specific order for carrying out steps in the setup of a device.

In embodiments, a user-guide file within the internal user-guide server 220 triggers an action to be taken by the CPE device 110. The user-guide file can be output to the subscriber and can further cause the CPE device 110 to automatically begin a diagnostic or self-remedy procedure. For example, when an issue with a connection between the CPE device 110 and a network exists, the CPE device 110 can rescan for a radio frequency or retrain a DSL connection. As another example, when an issue with a network layer exists (e.g., the CPE device 110 is receiving a signal from the network, but the CPE device is unable to receive requested content from the network, or the CPE device has incomplete network configuration parameters), the CPE device 110 can renew a corresponding dynamic host configuration protocol (DHCP) server and/or point-to-point protocol (PPP) server connection.

In embodiments, the internal user-guide server 220 includes a buffer 235. The buffer 235 can store a subscriber communication (e.g., URL or IP address received from the subscriber). When the redirection controller 230 is enabled, the routing module 210 can forward the subscriber communication to the buffer 235. In embodiments, when the status detection module 215 determines that a network connection issue no longer exists, the buffer 235 can output the subscriber communication through the network interface 225.

Figure 3:
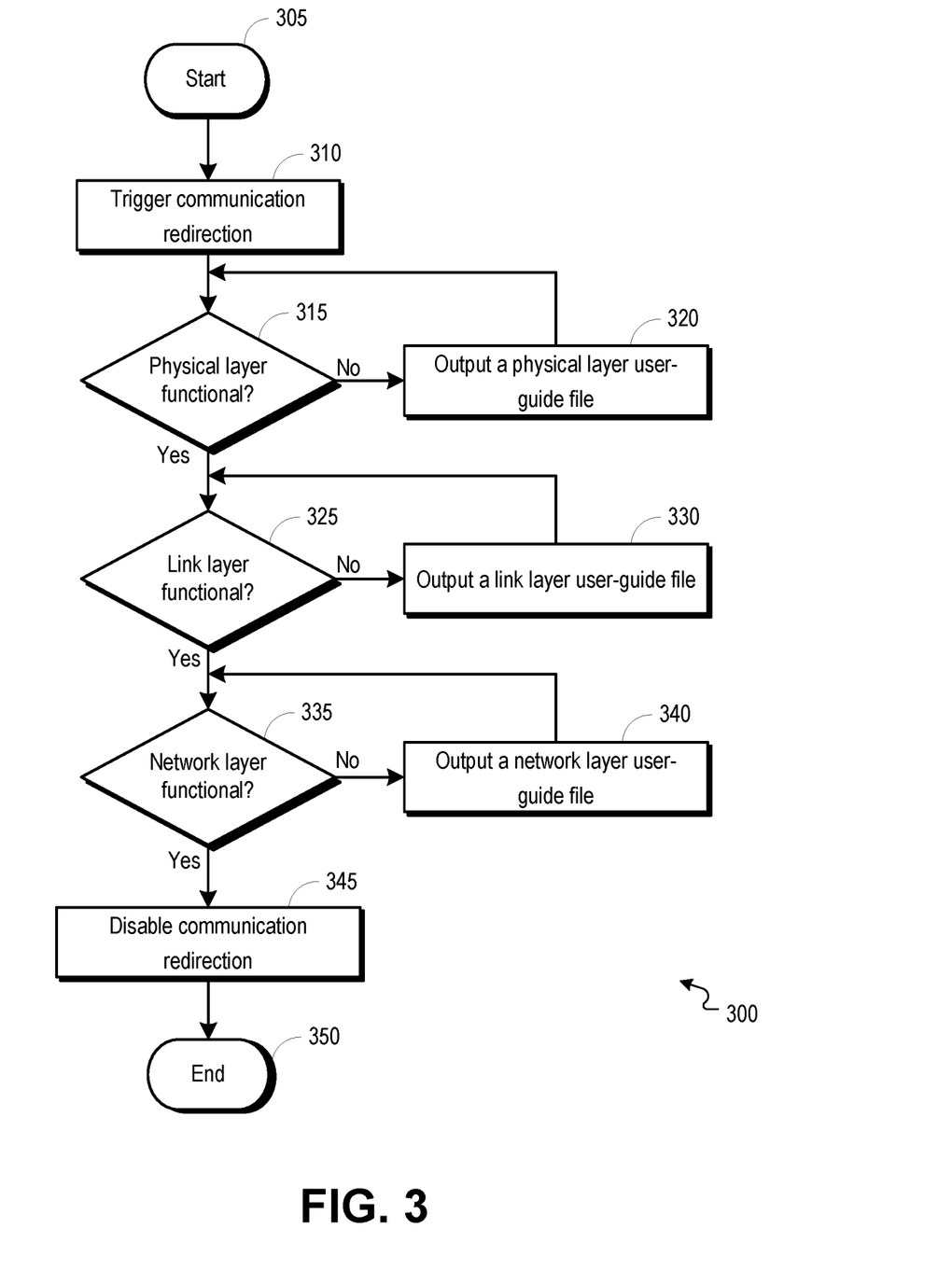
FIG. 3 is a flowchart illustrating an example process operable to facilitate delivery of information from an internal server of a CPE device.

FIG. 3 is a flowchart illustrating an example process 300 operable to facilitate delivery of information from an internal server of a CPE device. The process 300 can begin at 305, when a communication (e.g., a resource identifier) is received at a CPE device and a network interface of the CPE device is not fully functioning or is not functioning properly. In embodiments, a status detection module 215 of FIG. 2 determines that the network interface is not functioning properly or is otherwise inoperable. For example, the status detection module 215 can determine the status of a CPE device's network connection by searching for, identifying, and/or analyzing a downstream signal received at the CPE device.

At 310, communication redirection can be triggered. In embodiments, a status detection module 215 of FIG. 2 can enable communication redirection (e.g., DNS redirection) when it is determined that the network interface of the associated CPE device is not functioning properly or is otherwise inoperable. In embodiments, while communication redirection is enabled, a subscriber request (e.g., HTTP request) for data or services through the CPE device is redirected to a server associated with the CPE device (e.g., internal user-guide server 220 of FIG. 2). For example, routing module 210 of FIG. 2 can translate a destination address of a subscriber request (e.g., URL or IP address of a requested file) into an address associated with the CPE device.

At 315, a determination can be made whether the physical layer associated with the CPE device is functional. The determination whether the physical layer is functional can be made, for example, by the status detection module 215 of FIG. 2. In embodiments, the determination whether the physical layer is functional is based upon whether the CPE device is receiving a signal from a network (e.g., WAN 120 of FIG. 1). If the determination is made that the physical layer is not functional, the process 300 can proceed to 320.

At 320, a user-guide file (e.g., file containing information for troubleshooting an issue or setting up an associated device) associated with the physical layer of the CPE device can be output to a subscriber. In embodiments, a redirection controller 230 of FIG. 2 translates the communication received from the subscriber into an address associated with a server associated with the CPE device (e.g., internal user-guide server 220 of FIG. 2). In embodiments, the redirection controller 230 of FIG. 2 identifies a specific troubleshooting or setup step and translates the communication received from the subscriber into a request for a file stored at the internal user-guide server 220, the requested file containing information associated with the specific troubleshooting or setup step. For example, the redirection controller 230 can identify a specific file within the internal user-guide server 220 based upon the status of one or more hardware components as determined by the status detection module 215. As another example, the specific file identified by the redirection controller 230 can be the next file within a hierarchy of files stored in the internal user-guide server 220. In embodiments, the translated request is then delivered to the internal user-guide server 220, and the specific file is output to the subscriber. After the physical layer user-guide file is output to the subscriber, the process 300 can return to 315.

Returning to 315, if the determination is made that the physical layer is functional, the process 300 can proceed to 325. At 325, a determination can be made whether the link layer associated with the CPE device is functional. The determination whether the link layer is functional can be made, for example, by the status detection module 215 of FIG. 2. In embodiments, the determination whether the link layer is functional is based upon a connection between the CPE device and an upstream device. For example, the determination whether the link layer is functional can be based upon the status of synchronization between the CPE device and an upstream network device (e.g., whether the CPE device is in the process of synchronizing, DSL training, radio frequency scanning and locking, etc.). If the determination is made that the link layer is not functional, the process 300 can proceed to 330.

At 330, a user-guide file (e.g., file containing information for troubleshooting an issue or setting up an associated device) associated with the link layer of the CPE device can be output to a subscriber. In embodiments, a redirection controller 230 of FIG. 2 translates the communication received from the subscriber into an address associated with a server associated with the CPE device (e.g., internal user-guide server 220 of FIG. 2). In embodiments, the redirection controller 230 of FIG. 2 identifies a specific troubleshooting or setup step and translates the communication received from the subscriber into a request for a file stored at the internal user-guide server 220, the requested file containing information associated with the specific troubleshooting or setup step. For example, the redirection controller 230 can identify a specific file within the internal user-guide server 220 based upon the status of one or more network components as determined by the status detection module 215. As another example, the specific file identified by the redirection controller 230 can be the next file within a hierarchy of files stored in the internal user-guide server 220. In embodiments, the translated request is then delivered to the internal user-guide server 220, and the specific file is output to the subscriber. In embodiments, the file can trigger a diagnostic or remedial action to be taken by the CPE device. When the link layer is not functional, a diagnostic or remedial action associated with the link layer can be taken by the CPE device. For example, the CPE device 110 can attempt to re-synchronize with an upstream device, re-train a DSL connection, re-scan for a radio frequency, as well as attempt other remedial measures. After the link layer user-guide file is output, the process 300 can return to 325.

Returning to 325, if the determination is made that the link layer is functional, the process 300 can proceed to 335. At 335, a determination can be made whether the network layer associated with the CPE device is functional. The determination whether the network layer is functional can be made, for example, by the status detection module 215 of FIG. 2. In embodiments, the determination whether the network layer is functional is based upon a configuration status between the CPE device and a network (e.g., subscriber network 130 of FIG. 1, WAN 120 of FIG. 1, etc.). When the CPE device is receiving a signal from the network, but the CPE device is unable to receive requested content from the network, the determination can be made that the network layer is not functional. When the CPE device has incomplete network configuration parameters (e.g., IP address, packet routing information, assigned transmission time periods, etc.), the determination can be made that the network layer is not functional. For example, the determination whether the network layer is functional can be based upon the CPE device's DHCP status (e.g., whether a connection between the CPE device and a DHCP server is discovered, successful, failed, etc.) or a PPP status (e.g., authenticated, connected, failed, etc.). If the link layer is connected, the CPE device may be able to receive and send frames, but may not be able to transmit IP packets if the CPE device does not have an IP address. If the determination is made that the network layer is not functional, the process 300 can proceed to 340.

At 340, a user-guide file (e.g., file containing information for troubleshooting an issue or setting up an associated device) associated with the network layer of the CPE device can be output to a subscriber. In embodiments, a redirection controller 230 of FIG. 2 translates the communication received from the subscriber into an address associated with a server associated with the CPE device (e.g., internal user-guide server 220 of FIG. 2). In embodiments, the redirection controller 230 of FIG. 2 identifies a specific troubleshooting or setup step and translates the communication received from the subscriber into a request for a file stored at the internal user-guide server 220, the requested file containing information associated with the specific troubleshooting or setup step. For example, the redirection controller 230 can identify a specific file within the internal user-guide server 220 based upon the status of one or more network components as determined by the status detection module 215. As another example, the specific file identified by the redirection controller 230 can be the next file within a hierarchy of files stored in the internal user-guide server 220. In embodiments, the translated request is then delivered to the internal user-guide server 220, and the specific file is output to the subscriber. In embodiments, the file can trigger a diagnostic or remedial action to be taken by the CPE device. When the network layer is not functional, a diagnostic or remedial action associated with the network layer can be taken by the CPE device. For example, the CPE device can attempt to reestablish a connection with a DHCP or PPP server, or attempt other remedial measures. After the network layer user-guide file is output, the process 300 can return to 335.

Returning to 335, if the determination is made that the network layer is functional, the process 300 can proceed to 345. At 345, communication redirection can be disabled at the CPE device. After communication redirection is disabled, the process 300 can end at 350.

Figure 4:
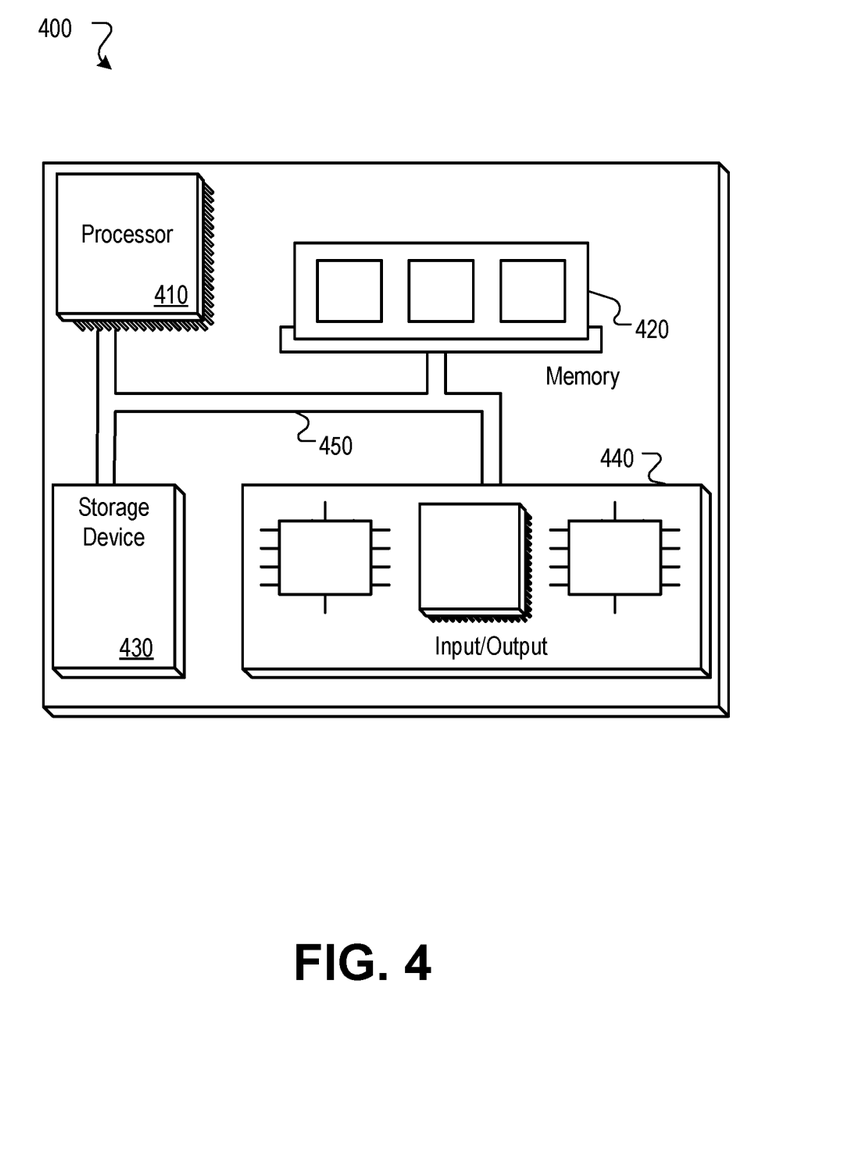
FIG. 4 is a block diagram of a hardware configuration operable to facilitate delivery of information from an internal server of a device.

FIG. 4 is a block diagram of a hardware configuration 400 operable to facilitate delivery of information from an internal server of a device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1).

Those skilled in the art will appreciate that the invention improves upon methods and apparatuses for providing troubleshooting and/or setup information associated with a CPE device to a user. The methods, systems, and apparatuses described in this disclosure enable the delivery of a user-guide file associated with a CPE device from an internal server within the CPE device to a subscriber, the user-guide file comprising information for troubleshooting an issue with or setting up the CPE device. In embodiments, the user-guide file output to the subscriber can be based upon a status of a connection between the CPE device and a network, the status being determined by the CPE device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
receiving a resource identifier at a device, the resource identifier being associated with a location that is external to the device;
determining that an issue exists with a connection between the device and a network;
converting the resource identifier to a server address, the server address being associated with a server that is within the device;
identifying a file within the server, the identified file comprising information associated with solving the issue with the connection between the device and the network, wherein the server comprises multiple files that are ordered in a hierarchy based upon dependencies existing between device components associated with each of the multiple files, and wherein the identified file is a next file in the hierarchy following a last file that was output from the hierarchy within a predetermined period of time; and
outputting the file from the server.

2. The method of claim 1, further comprising:
determining that an issue exists with a component associated with the device, and the identified file further comprises information associated with solving the issue with the component.

3. The method of claim 1, further comprising:
determining that the device is receiving a signal from the network, but that the device is unable to receive requested content from the network; and
attempting to synchronize the device with an upstream device.

4. The method of claim 1, further comprising:
determining that the device is receiving a signal from the network, but that network configuration parameters associated with the device are incomplete; and
attempting to retrieve the network configuration parameters from an upstream server.

5. The method of claim 1, wherein the server comprises multiple files, each of the multiple files comprising information associated with a step for setting up the device and the multiple files are ordered in a hierarchy based upon a predetermined order for carrying out each of one or more steps during setup of the device, and wherein the identified file is the next file in the hierarchy following the last file that was output from the hierarchy within a predetermined period of time.

6. The method of claim 1, further comprising:
storing the received resource identifier; and
when the issue with the connection between the device and the network is solved, outputting the resource identifier.

7. An apparatus comprising:
an interface that receives a resource identifier, the resource identifier being associated with a location that is external to the apparatus;
a server comprising one or more files;
a status module that determines that an issue exists with a connection between the apparatus and a network;
a routing module that converts the resource identifier to a server address, the server address being associated with the server;
the status module further identifying a file within the server, the identified file comprising information associated with solving the issue with the connection between the apparatus and the network, wherein the server comprises multiple files that are ordered in a hierarchy based upon dependencies existing between device components associated with each of the multiple files, and wherein the identified file is a next file in the hierarchy following a last file that was output from the hierarchy within a predetermined period of time; and the server further outputting the identified file.

8. The apparatus of claim 7, wherein the status module determines that an issue exists with a component associated with the apparatus, and the identified file further comprises information associated with solving the issue with the component.

9. The apparatus of claim 7, wherein:
the status module determines that the apparatus is receiving a signal from the network, but that the apparatus is unable to receive requested content from the network; and
the identified file triggers the apparatus to attempt to synchronize with an upstream device.

10. The apparatus of claim 7, wherein the server comprises multiple files, each of the multiple files comprising information associated with a step for configuring the device and the multiple files are ordered in a hierarchy based upon a predetermined order for carrying out each of one or more steps during configuration of the apparatus, and wherein the identified file is the next file in the hierarchy following the last file that was output from the hierarchy within a predetermined period of time.

11. The apparatus of claim 7, further comprising storage configured to:
store the received resource identifier; and
when the issue with the connection between the apparatus and the network is solved, output the resource identifier.

12. One or more non-transitory computer readable media having instructions operable to cause one or more processors to perform operations comprising:
receiving a resource identifier at a device, the resource identifier being associated with a location that is external to the device;
determining that an issue exists with a connection between the device and a network;
converting the resource identifier to a server address, the server address being associated with a server that is within the device;
identifying a file within the server, the identified file comprising information associated with solving the issue with the connection between the device and the network, wherein the server comprises multiple files that are ordered in a hierarchy based upon dependencies existing between device components associated with each of the multiple files, and wherein the identified file is a next file in the hierarchy following a last file that was output from the hierarchy within a predetermined period of time; and
outputting the file from the server.

13. The one or more non-transitory computer-readable media of claim 12, wherein the instructions are further operable to cause the one or more processors to determine that an issue exists with a component associated with the device, and the identified file further comprises information associated with solving the issue with the component.

14. The one or more non-transitory computer-readable media of claim 12, wherein the instructions are further operable to cause the one or more processors to perform the operations comprising:
determining that the device is receiving a signal from the network, but that the device is unable to receive requested content from the network; and
attempting to synchronize the device with an upstream device.

15. The one or more non-transitory computer-readable media of claim 12, wherein the instructions are further operable to cause the one or more processors to perform the operations comprising:
determining that the device is receiving a signal from the network, but that network configuration parameters associated with the device are incomplete; and
attempting to retrieve the network configuration parameters from an upstream server.

16. The one or more non-transitory computer-readable media of claim 12, wherein the server comprises multiple files, each of the multiple files comprising information associated with a step for configuring the device and the multiple files are ordered in a hierarchy based upon a predetermined order for carrying out each of one or more steps during configuration of the device, and wherein the identified file is the next file in the hierarchy following the last file that was output from the hierarchy within a predetermined period of time.

17. The one or more non-transitory computer-readable media of claim 12, wherein the instructions are further operable to cause the one or more processors to perform the operations comprising:
storing the received resource identifier; and
when the issue with the connection between the device and the network is solved, outputting the resource identifier.

* * * * *